C. A. McCAUGHAN.
Rotary Cultivator.
No. 61,845. Patented Feb. 5. 1867.
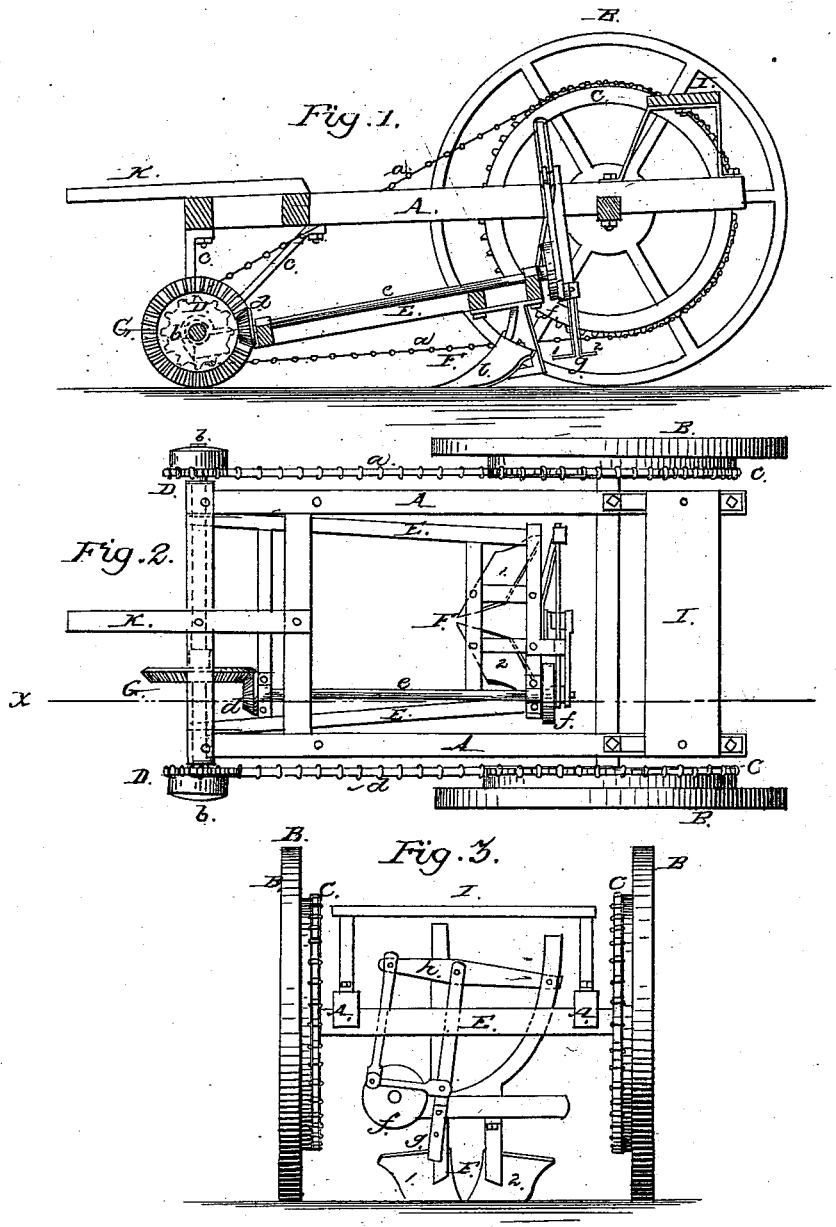

United States Patent Office.

CHARLES A. McCAUGHAN, OF MOSCOW, TENNESSEE.

Letters Patent No. 61,845, dated February 5, 1867.

IMPROVEMENT IN MACHINE FOR THINNING COTTON PLANTS.

The Schedule referred to in these Letters Patent and making part of the same.

TO ALL WHOM IT MAY CONCERN:

Be it known that I, CHARLES A. McCAUGHAN, of Moscow, in the county of Fayette, and State of Tennessee, have invented a new and improved Machine for Thinning Cotton Plants; and I do hereby declare that the following is a full, clear, and exact description thereof, which will enable others skilled in the art to make and use the same, reference being had to the accompanying drawings, forming part of this specification, in which—

Figure 1 is a longitudinal vertical section of the machine of my invention taken in the plane of the line $x$ $x$, fig. 2.

Figure 2 is a top view of the same.

Figure 3 is a rear view of the same.

Similar letters of reference indicate like parts.

The object of this invention is to save hand labor and expedite the work of thinning cotton plants growing in rows to the proper distances apart for hills, as usually cultivated on the plantations in the southern States. By the old method the plants, which are sowed thickly in a wide drill, are cut down to a narrow row by scrapers run on each side, and are then thinned out at proper distances in the row with hoes. This is a tedious and laborious operation, and with my improved combined double scraper and transverse swinging cutters, which performs both operations at once, the work is not only executed with greater economy and dispatch, but with more regularity in the standing plants, making subsequent cultivation easier.

A frame, A, is mounted on two driving-wheels, B B, on the inside of which are concentric toothed wheels, C C, over which pass endless chains, $a$ $a$, that actuate small toothed wheels, D D, on the shaft $b$, hung at the front end of the frame A on pendants or brackets, $c$ $c$, at each side of the frame. I is a driver's seat, and K the draught-pole. Under the frame A a stout rectangular frame, E, is hung on the inside of the two side brackets $c$ $c$, so that a double scraper, F, fastened under the rear end of the frame, shall rest on the ground. On the shaft $b$ is fitted a bevel-wheel, G, which hangs under the forward end of the frame A, and is suspended by the draught-pole when the horses are attached. The bevel-wheel G engages in a small bevel-wheel, $d$, on the end of a shaft, $e$, that runs back upon the frame E to the rear end, whereon is attached a disk or plate-crank, $f$, connected with a double cutter, $g$, suspended to vibrate transversely on a swinging frame, $h$, secured to the frame E. The double scraper F is made in two parts, 1, 2, like mould-boards of a plough, but far enough apart to leave a row of standing cotton plants of proper width in the drill or bed when the machine is worked. The suspended transverse cutter $g$ is also made in two parts, 1, 2, each part being a flat sharp-edged steel plate with a space between them wide enough to leave a sufficient number of cotton plants standing at equal distances apart in the row, when the cutter vibrates on the swinging frame $h$ and strikes them laterally, which is done at every revolution of the crank $f$, receiving its motion from the shaft $e$, operated by the guide-wheel G, as the machine moves forward in the field.

My invention is not restricted to the particular arrangement of the framing and gearing, as they may be variously modified without deviating from the principle and the essential features thereof. Instead of endless chains working in toothed wheels to operate the transverse cutters, cog-gearing may be employed, and apparatus for guiding the machine exactly along a row of plants may be advantageously applied.

Having described the construction and operation of my invention, what I claim as new, and desire to secure by Letters Patent, is—

The double scraper F, attached to suspended frame E, combined with the double transverse cutter $g$, operated by the swinging frame $h$, for the purpose of thinning cotton plants in a row at one operation, constructed and operating substantially as herein described.

CHARLES A. McCAUGHAN.

Witnesses:
W. H. GUYER,
L. C. McCAUGHAN.